United States Patent
Agner

(10) Patent No.: US 7,392,890 B2
(45) Date of Patent: Jul. 1, 2008

(54) TORQUE TRANSMITTING UNIT

(75) Inventor: Ivo Agner, Bühl (DE)

(73) Assignee: LuK Lamellen und Kupplungsbau Beteiligungs KG, Bühl (DE)

(*) Notice: Subject to any disclaimer, the term of this patent is extended or adjusted under 35 U.S.C. 154(b) by 273 days.

(21) Appl. No.: 11/156,617

(22) Filed: Jun. 20, 2005

(65) Prior Publication Data

US 2005/0279603 A1    Dec. 22, 2005

(30) Foreign Application Priority Data

Jun. 21, 2004   (DE) ................. 10 2004 029 777

(51) Int. Cl.
*B60K 17/02*  (2006.01)
*F16D 25/10*  (2006.01)
*F16D 21/06*  (2006.01)

(52) U.S. Cl. ............... 192/48.8; 192/87.11; 192/110 B

(58) Field of Classification Search .......... 192/87.11, 192/112, 110 B
See application file for complete search history.

(56) References Cited

U.S. PATENT DOCUMENTS 2,036,005 A * 3/1936 Wemp ................... 192/70.21
4,561,532 A * 12/1985 Knodel ................... 192/55.3
2005/0139023 A1   6/2005 Kraxner et al. ............ 74/325
2005/0139442 A1 * 6/2005 Agner et al. ............ 192/48.8

FOREIGN PATENT DOCUMENTS

| DE | 101 14 281 A1 | 9/2002 |
| DE | 102 31 405 A1 | 2/2003 |
| DE | 102 23 780 C1 | 10/2003 |
| DE | 203 10 015 U1 | 10/2003 |
| EP | 1 174 631 A2 | 1/2002 |
| WO | WO 03/006839 A2 | 1/2003 |

* cited by examiner

*Primary Examiner*—Richard M Lorence
(74) *Attorney, Agent, or Firm*—Alfred J. Mangels

(57) ABSTRACT

A torque transmitting unit in the power train of a motor vehicle for transmitting torque between a drive unit having an output shaft and a transmission having at least one input shaft. A clutch is positioned between the transmission input shaft and the drive unit output shaft. The clutch includes an input part that has a clutch cover that defines a clutch-containing volume and that is supported by a transmission housing section. In order to limit axial vibrations of the clutch, the clutch input part is axially supported by a bearing.

24 Claims, 3 Drawing Sheets

TORQUE TRANSMITTING UNIT

BACKGROUND OF THE INVENTION

The present invention relates to a torque transmitting unit in the power train of a motor vehicle for transferring torque between a drive unit, in particular a combustion engine, having an output shaft, in particular a crankshaft, and a transmission having at least one input shaft, there being inserted between the transmission input shaft and the output shaft of the combustion engine a clutch device having at least one input part, which has a clutch housing section, in particular a clutch cover, which limits the volume accommodating the clutch device and is supported by a transmission housing section.

The object of the invention is to create a simply constructed and economically manufacturable torque transmitting unit with which fewer vibrations occur in the coupling device in the axial direction than with conventional torque transmitting units.

SUMMARY OF THE INVENTION

The object is achieved with a torque transmitting unit in the power train of a motor vehicle for transferring torque between a drive unit, in particular a combustion engine, having an output shaft, in particular a crankshaft, and a transmission having at least one input shaft, there being inserted between the transmission input shaft and the output shaft of the drive unit a clutch device having at least one input part which has a clutch housing section, in particular a clutch cover, which limits the volume accommodating the clutch device and is supported by a transmission housing section, in that the input part of the clutch device is borne or supported in the axial direction on the clutch housing section with the help of a bearing device. Due to the bearing of the clutch input part according to the invention, bearing devices between the input part of the clutch device and the transmission input shaft or the output shaft of the drive unit may be dispensed with.

A preferred exemplary embodiment of the torque transmitting unit is characterized in that the clutch device includes a wet operating clutch arrangement, in particular a multiple-disk clutch arrangement, which is operable by means of an operating lever which is connected to the input part of the clutch device in a rotationally fixed connection. Lever-operated wet clutches have the disadvantage that the operating forces which are brought in from outside through an appropriate actuating system have to be braced. It is possible to support the clutch input part in the axial direction on the crankshaft of the combustion engine. The bearing or supporting of the clutch input part in the radial direction can be accomplished for example by a needle bearing or journal bearing which is supported in the radial direction on the transmission input shaft. In conjunction with the present invention it was determined that when the clutch input part is supported in the axial direction on the crankshaft, bending vibrations which develop due to gas cycle forces of the combustion engine are transferred directly to the wet clutch arrangement in the form of axial vibration. Since the engagers are supported on the transmission housing in lever-operated wet clutches, these vibrations are transmitted to the operating lever and can falsify the counterpressure force. The torque transmitting unit according to the present invention enables a cost-effective solution to be produced, which makes both radial and axial support of the wet clutch and a vibration-free support point possible.

Another preferred exemplary embodiment of the torque transmitting unit is characterized in that an axial bearing device is positioned between the input part of the clutch device and the clutch housing section. The axial bearing device may be for example an axial roller bearing or an axial needle bearing. An axial journal bearing may also be provided, however.

Another preferred exemplary embodiment of the torque transmitting unit is characterized in that a radial bearing device is positioned between the input part of the clutch device and the clutch housing section or between the input part of the clutch device and the at least one transmission input shaft. The radial bearing device may be supported directly on one of the transmission input shafts, or through hubs on one of the transmission input shafts.

Another preferred exemplary embodiment of the torque transmitting unit is characterized in that an axial bearing device, preferably an axial roller bearing, is positioned radially outside of one end of the clutch housing section, in particular a clutch cover.

Another preferred exemplary embodiment of the torque transmitting unit is characterized in that the radial bearing device is positioned radially inside a radial shaft seal ring.

Another preferred exemplary embodiment of the torque transmitting unit is characterized in that the radial bearing device is positioned axially overlapping the radial shaft seal ring.

Another preferred exemplary embodiment of the torque transmitting unit is characterized in that the radial bearing device is positioned in the radial direction between a leg of the clutch input part and a hub part.

Another preferred exemplary embodiment of the torque transmitting unit is characterized in that the radial bearing device and the axial bearing device are made of a single part or of a plurality of parts. The radial bearing device and the axial bearing device may be formed for example as journal bearings or as needle bearings.

Another preferred exemplary embodiment of the torque transmitting unit is characterized in that the bearing device, for example a thin ring ball bearing device, is designed and positioned between the clutch housing section and the input part of the clutch device in such a way that the input part of the clutch device is supported in both the radial and the axial directions on the clutch housing section. The thin ring ball bearing is preferred because of the low friction losses.

Another preferred exemplary embodiment of the torque transmitting unit is characterized in that the bearing device has a contact normal which is tilted from the radial direction. That makes support in both the radial and the axial directions possible in a simple way.

Another preferred exemplary embodiment of the torque transmitting unit is characterized in that a journal bearing device is positioned between the clutch housing section and the input part of the clutch device. The journal bearing device may be effective in both the radial and the axial directions, i.e., it may for example be provided with an axial thrust face. The axial and radial support functions of the journal bearing may also be separate, however.

Another preferred exemplary embodiment of the torque transmitting unit is characterized in that a seal device, for example a radial shaft seal ring, is positioned between the input part of the clutch device and the clutch housing section. The seal device seals the interior of the clutch device toward the outside.

Another preferred exemplary embodiment of the torque transmitting unit is characterized in that the bearing device is positioned coaxial to and radially outside of the seal device.

That creates an easily realized possibility for positioning the bearing device in the interior of the clutch device, which is sealed toward the outside by the seal device.

Another preferred exemplary embodiment of the torque transmitting unit is characterized in that the bearing device is positioned overlapping the seal device in the axial direction. That makes it possible to save construction space in the axial direction.

Another preferred exemplary embodiment of the torque transmitting unit is characterized in that the bearing device is positioned in a wet chamber which is bounded by the clutch housing section. That makes it possible to supply the bearing device with lubricant from the wet chamber of the clutch device in a simple way.

Another preferred exemplary embodiment of the torque transmitting unit is characterized in that two wet operating clutch arrangements are positioned coaxially and overlapping each other in the axial direction. That makes it possible to save construction space in the axial direction.

Another preferred exemplary embodiment of the torque transmitting unit is characterized in that a vibration damping unit is inserted between the output shaft of the drive unit and the clutch device. The vibration coupling device serves to reduce unwanted transfer of vibrations from the drive unit to the transmission.

Another preferred exemplary embodiment of the torque transmitting unit is characterized in that the clutch housing section is formed in a single piece with the transmission housing section. That makes it possible to reduce the number of individual parts.

In a power train of a motor vehicle, the object indicated above is solved by a torque transmitting unit described earlier.

BRIEF DESCRIPTION OF THE DRAWINGS

Additional advantages, characteristics, and details of the present invention are evident from the following description, in which various embodiments are described in detail with reference to the drawings. The characteristics mentioned in the claims and in the description may be essential to the invention individually by themselves or in any combination. The figures show the following:

DESCRIPTION OF THE PREFERRED EMBODIMENTS

Figure 1:
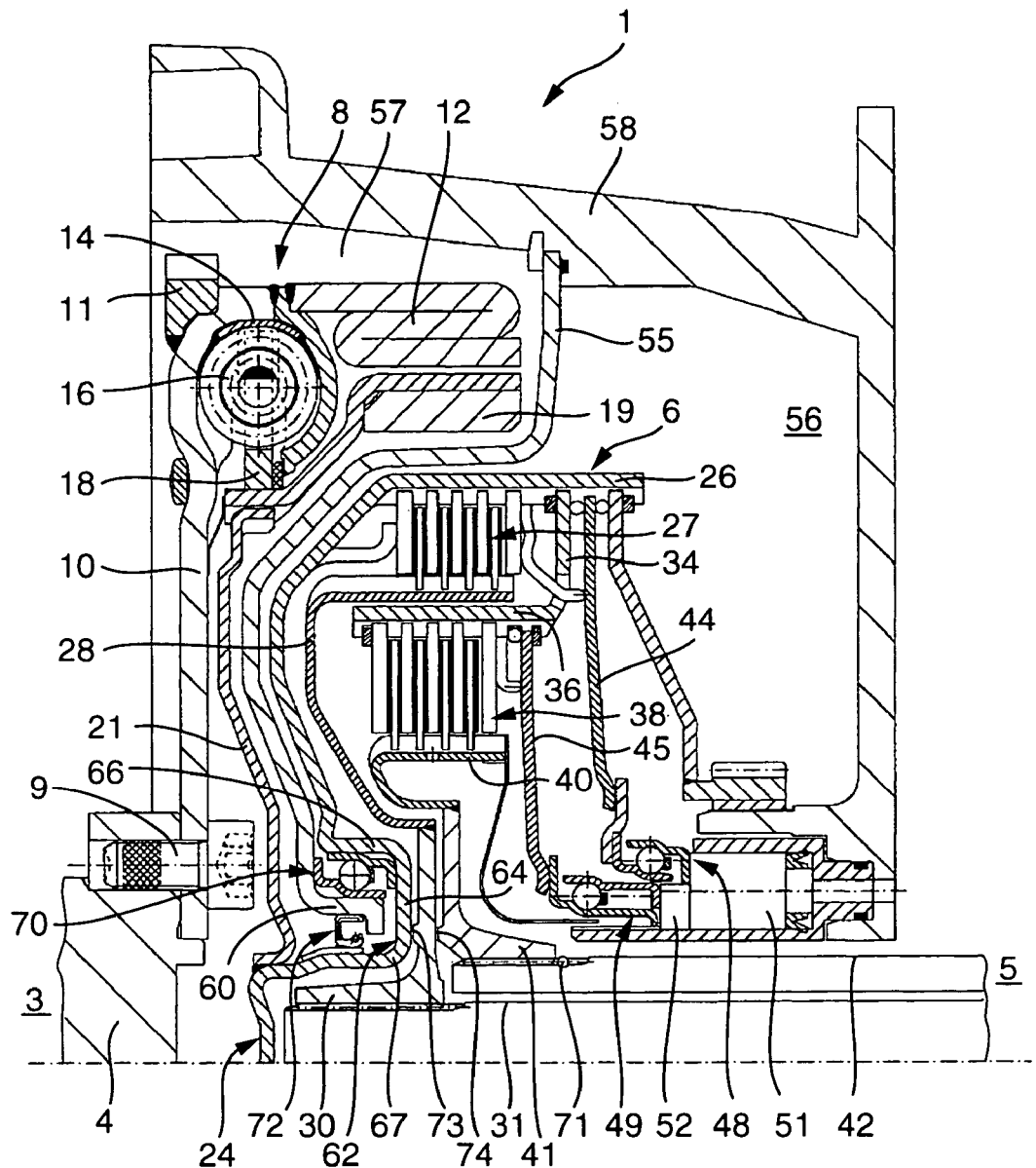
FIG. 1 shows a half-sectional view of a torque transmitting unit according to the present invention, having a thin ring ball bearing.

Part of a power train 1 of a motor vehicle is illustrated in FIG. 1. Positioned between a drive unit 3, in particular a combustion engine, from which a crankshaft 4 extends, and a transmission 5, is a wet operating double clutch 6 of multiple-disk design. Connected between drive unit 3 and double clutch 6 is a vibration damping unit 8. The vibration damping unit is preferably a two-mass flywheel.

Crankshaft 4 of combustion engine 3 is rigidly connected through a screw connection 9 to an input part 10 of vibration damping unit 8. Input part 10 of vibration damping unit has essentially the form of a circular ring extending in the radial direction, to which a starter gear rim 11 is welded radially on the outside. In addition, a centrifugal mass 12 is welded onto the input part 10 of vibration damping unit 8. Furthermore, attached to input part 10 of vibration damping unit 8 is a vibration damper cage 14, which at least partially incorporates a plurality of energy storage devices, in particular spring devices 16. An output part 18 of vibration damping unit 8 engages spring devices 16. Another centrifugal mass 19 is attached to output part 18 of vibration damping unit 8. Output part 18 of vibration damping unit 8 is rigidly connected through a connecting part 21 to an input part 24 of double clutch 6. Clutch input part 24 is joined in one piece to an outer disk carrier 26 of a first multiple-disk clutch arrangement 27. Positioned radially inside outer disk carrier 26 is an inner disk carrier 28 of first multiple-disk clutch arrangement 27. Inner disk carrier 28 is attached radially inside to a hub piece 30, which is connected through toothing to a first transmission input shaft 31 in a rotationally fixed connection.

Clutch input part 24, or outer disk carrier 26 of first multiple-disk clutch arrangement 27, which is connected to the latter in a single piece, is connected through a connecting part 34 to an outer disk carrier 36 of a second multiple-disk clutch arrangement 38 in a rotationally fixed connection. Positioned radially inside outer disk carrier 36 is an inner disk carrier 40 of second multiple-disk clutch arrangement 38, which is rigidly connected radially on the inside to a hub part 41. Hub part 41 is connected through toothing in a rotationally fixed connection to a second transmission input shaft 42, which is designed as a hollow shaft. First transmission input shaft 31 is positioned in second transmission input shaft 42 so that it can rotate.

The two multiple-disk clutch arrangements 27 and 38 are operated by means of operating levers 44 and 45, whose radially inner ends are supported on operating bearings 48, 49. Operating bearings 48, 49 are operated in the axial direction with the help of operating pistons 51, 52. Operating pistons 51, 52 are arranged in fixed positions with respect to operating levers 44, 45, which pivot with clutch input part 24.

Positioned between connecting part 21 and outer disk carrier 26 of first multiple-clutch arrangement 27 is a clutch cover 55, which is attached radially on the outside to a transmission housing section 58. Clutch cover 55 may also be made in a single piece with transmission housing section 58. Clutch cover 55 separates a wet chamber 56, in which the two multiple-disk clutch arrangements 27 and 38 are positioned, from a dry receiving chamber 57, in which vibration damping unit 8 is positioned. Clutch cover 55 has, radially on the inside, an essentially L-shaped end 60, viewed in cross section, which projects into a ring chamber 62 that is formed by a section of clutch input part 24 with a U-shaped cross section. The U-shaped cross section of receiving chamber 62 contains a radially arranged base 64, from which two legs 66 and 67 extend in axial direction.

Between clutch input part 24 and clutch cover 55 is a thin ring ball bearing 70, which is supported in both the radial and the axial directions on end 60 of clutch cover 55 on the one hand, and on the base 64 and the leg 66 of clutch input part 24 on the other hand. Thin ring ball bearing 70 has a contact normal which is tilted from the radial direction.

Radially inside of and axially overlapping thin ring ball bearing 70 is a radial shaft seal ring 72, positioned between end 60 of clutch cover 55 and clutch input part 24. Thin ring ball bearing 70 is positioned completely in wet chamber 56, which is separated from dry chamber 57 by a radial shaft seal ring 72. Thin ring ball bearing 70 may be pre-mounted either on clutch cover 55 or on clutch input part 24. The other part may slide over the corresponding bearing ring during assembly. In the area of the bearing device no additional axial retaining rings are necessary. Shifting of the parts toward transmission 5 is limited by stops 73 and 74 inserted in series on hub parts 30 and 41, as well as a retaining ring 71 on second transmission input shaft 42. The solution depicted in FIG. 1 is also usable for single clutches.

Figure 2:
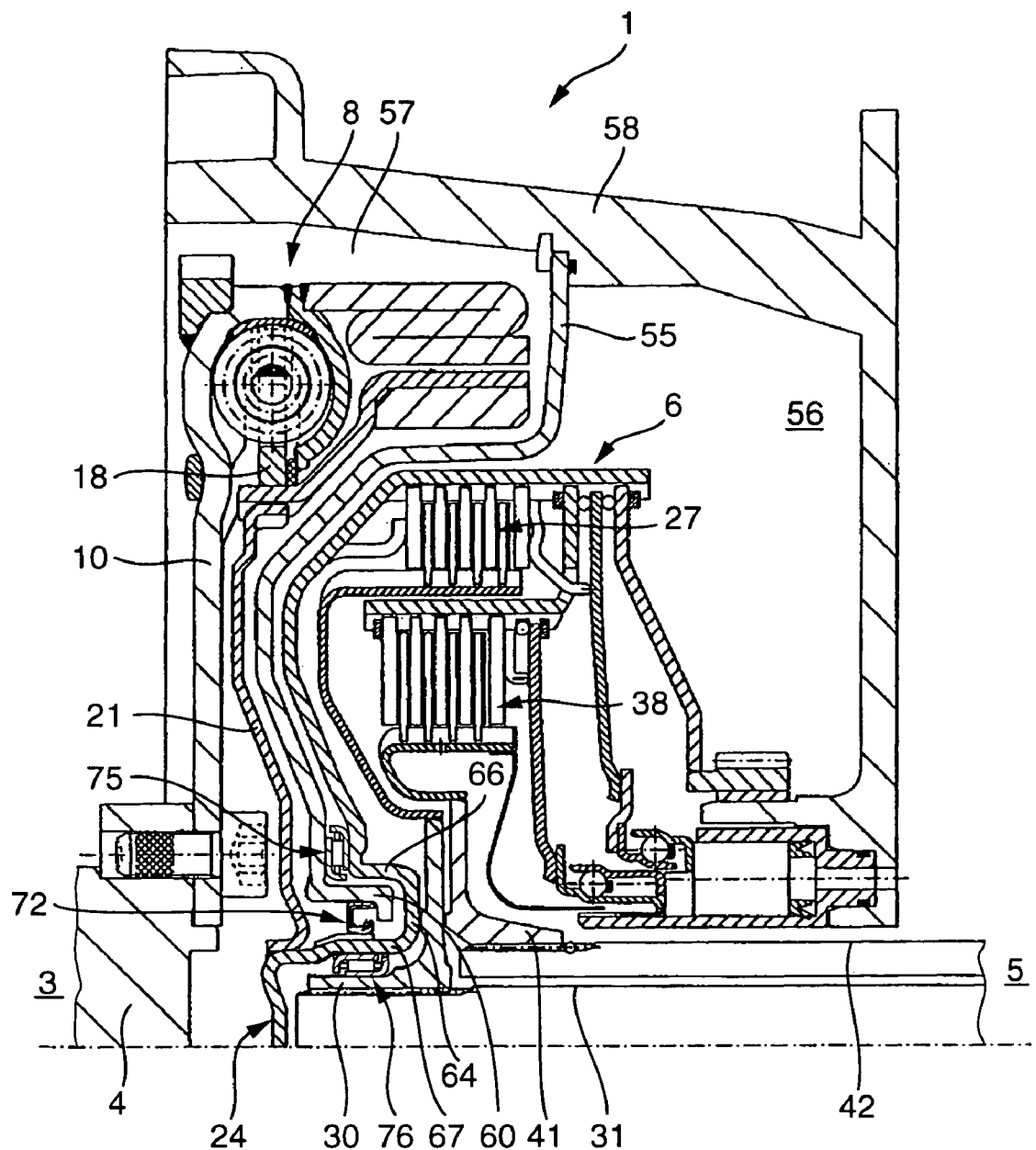
FIG. 2 shows a depiction similar to that in FIG. 1 according to a second exemplary embodiment having two roller bearings.
Figure 3:
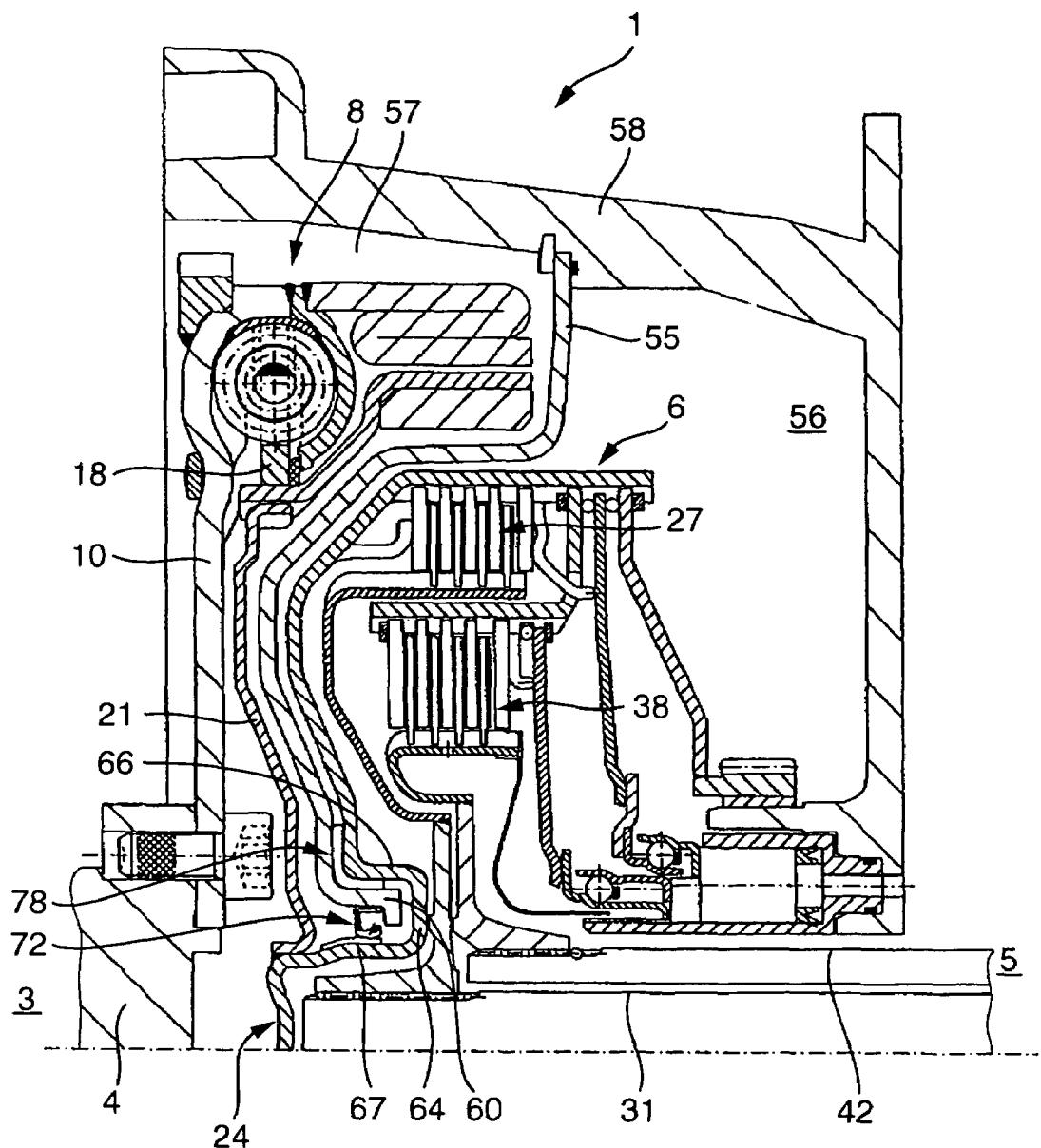
FIG. 3 shows a depiction similar to that in FIG. 1 according to a third exemplary embodiment having a journal bearing.

FIGS. 2 and 3 show depictions similar to that in FIG. 1. The same reference numerals are used to designate the same parts. To avoid repetitions, we refer to the preceding description of FIG. 1. In the following description we will only go into the differences between the embodiments.

In FIG. 2 an axial roller bearing 75 is positioned in the axial direction between clutch cover 55 and clutch input part 24, radially outside the end 60 of clutch cover 55. Radially inside of radial shaft seal ring 72 and axially overlapping it, a radial roller bearing 76 is positioned in the radial direction between leg 67 of clutch input part 24 and hub part 30. The radial force here, in contrast to the solutions in FIGS. 1 and 3, is supported via hub 30 on transmission input shaft 31. Both bearings may also be designed as journal bearings.

In FIG. 3 a radial journal bearing device 78 having an axial thrust face is positioned between the end 60 of clutch cover 55 and clutch input part 24. The journal bearing device 78 is positioned in wet chamber 56.

What is claimed is:

1. A torque transmitting unit for a power train of a motor vehicle for transmitting torque between a drive unit output shaft and a transmission input shaft, said torque transmitting unit comprising: a clutch operatively connected between the transmission input shaft and the drive unit output shaft, wherein the clutch includes an input part, an operating lever connected with the clutch input part for operating the clutch, an axially movable operating element engaged with an end of the operating lever for moving the operating lever to selectively engage and disengage the clutch; the torque transmitting unit includes a clutch cover that defines a clutch-containing volume and that is supported by a transmission housing section; wherein the clutch input part is supported in an axial direction by the clutch cover with an intermediate bearing between the clutch input part and the clutch cover, wherein an axial operating force applied to the operating lever by the operating element for engaging the clutch is transmitted to and is balanced by the intermediate bearing; and wherein the clutch includes two wet operating clutch arrangements that are positioned coaxially and the two wet operating clutch arrangements include an inner wet operating clutch arrangement that is surrounded by an outer wet clutch arrangement.

2. A torque transmitting unit according to claim 1, wherein the wet operating clutch arrangements are multiple-disk clutches that are operable by respective operating levers having radially inner ends supported on respective operating bearings.

3. A torque transmitting unit according to claim 1, wherein the intermediate bearing is an axial bearing.

4. A torque transmitting unit according to claim 3, wherein the axial bearing is positioned radially outwardly of an inner end of the clutch cover.

5. A torque transmitting unit according to claim 1, wherein the intermediate bearing is a bearing having a contact normal that is radially lifted to accommodate both axial and radial loads.

6. A torque transmitting unit according to claim 5, wherein the radial bearing is positioned coaxially with a radial shaft seal ring.

7. A torque transmitting unit according to claim 5, wherein the radial bearing is positioned in the radial direction between a leg of the clutch input part and a hub positioned radially inwardly of the clutch input part leg.

8. A torque transmitting unit according to claim 7, wherein the radial bearing is a radial roller bearing.

9. A torque transmitting unit according to claim 1, including a radial bearing positioned radially inwardly of a radial shaft seal ring.

10. A torque transmitting unit according to claim 9, wherein the radial shaft seal ring is positioned between the clutch input part and the clutch cover.

11. A torque transmitting unit according to claim 10, wherein the intermediate bearing is positioned coaxially with and radially outwardly of the radial shaft seal ring.

12. A torque transmitting unit according to claim 10, wherein the intermediate bearing axially surrounds the radial shaft seal ring.

13. A torque transmitting unit according to claim 1, wherein the bearing is a thin ring ball bearing and supports the clutch in both a radial and an axial direction relative to the clutch cover.

14. A torque transmitting unit according to claim 13, wherein the bearing has a contact normal that is inclined relative to a radial plane passing through the bearing.

15. A torque transmitting unit according to claim 1, wherein the intermediate bearing is a journal bearing.

16. A torque transmitting unit according to claim 1, wherein the intermediate bearing is positioned in a wet chamber bounded by the clutch cover.

17. A torque transmitting unit according to claim 1, including a vibration damping unit positioned between the drive unit output shaft and the clutch.

18. A motor vehicle power train including a torque transmitting unit in accordance with claim 1.

19. A torque transmitting unit for a power train of a motor vehicle for transmitting torque between a drive unit output shaft and a transmission input shaft, said torque transmitting unit comprising: a clutch operatively connected between the transmission input shaft and the drive unit output shaft, wherein the clutch includes an input part, an operating lever connected with the clutch input part for operating the clutch, an axially movable operating element engaged with an end of the operating lever for moving the operating lever to selectively engage and disengage the clutch; the torque transmitting unit includes a clutch cover that defines a clutch-containing volume and that is supported by a transmission housing section; wherein the clutch input part is supported in an axial direction by the clutch cover with an intermediate bearing between the clutch input part and the clutch cover, wherein an axial operating force applied to the operating lever by the operating element for engaging the clutch is transmitted to and is balanced by the intermediate bearing; and a radial bearing positioned radially inwardly of a radial shaft seal ring for balancing radial loads.

20. A torque transmitting unit according to claim 19, wherein the radial shaft seal ring is positioned between the clutch input part and the clutch cover.

21. A torque transmitting unit according to claim 20, wherein the intermediate bearing is positioned coaxially with and radially outwardly of the radial shaft seal ring.

22. A torque transmitting unit according to claim 20, wherein the intermediate bearing axially surrounds the radial shaft seal ring.

23. A torque transmitting unit for a power train of a motor vehicle for transmitting torque between a drive unit output shaft and a transmission input shaft, said torque transmitting unit comprising: a clutch operatively connected between the transmission input shaft and the drive unit output shaft, wherein the clutch includes an input part, an operating lever connected with the clutch input part for operating the clutch, an axially movable operating element engaged with an end of the operating lever for moving the operating lever to selectively engage and disengage the clutch; the torque transmitting unit includes a clutch cover that defines a clutch-containing volume and that is supported by a transmission housing section; wherein the clutch input part is supported in an axial direction by the clutch cover with an intermediate bearing between the clutch input part and the clutch cover; wherein an axial operating force applied to the operating lever by the operating element for engaging the clutch is transmitted to and is balanced by the intermediate bearing; and a radial bearing positioned coaxially with a radial shaft seal ring.

24. A torque transmitting unit for a power train of a motor vehicle for transmitting torque between a drive unit output shaft and a transmission input shaft, said torque transmitting unit comprising: a clutch operatively connected between the transmission input shaft and the drive unit output shaft, wherein the clutch includes an input part, an operating lever connected with the clutch input part for operating the clutch, an axially movable operating element engaged with an end of the operating lever for moving the operating lever to selectively engage and disengage the clutch; the torque transmitting unit includes a clutch cover that defines a clutch-containing volume and that is supported by a transmission housing section; wherein the clutch input part is supported in an axial direction by the clutch cover with an intermediate bearing between the clutch input part and the clutch cover, wherein an axial operating force applied to the operating lever by the operating element for engaging the clutch is transmitted to and is balanced by the intermediate bearing; and a radial bearing positioned in a radial direction between a leg of the clutch input part and a hub positioned radially inwardly of the clutch input part leg.

* * * * *